US009433158B2

(12) United States Patent
Nagadome et al.

(10) Patent No.: US 9,433,158 B2
(45) Date of Patent: Sep. 6, 2016

(54) PLANT CULTIVATION SYSTEM (71) Applicant: Panasonic Corporation, Osaka (JP)

(72) Inventors: Ryuji Nagadome, Osaka (JP); Hiroshi Haji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 85 days.

(21) Appl. No.: 14/379,637

(22) PCT Filed: Dec. 7, 2012

(86) PCT No.: PCT/JP2012/007839
§ 371 (c)(1),
(2) Date: Aug. 19, 2014

(87) PCT Pub. No.: WO2013/124937
PCT Pub. Date: Aug. 29, 2013

(65) Prior Publication Data
US 2015/0014440 A1    Jan. 15, 2015

(30) Foreign Application Priority Data
Feb. 22, 2012   (JP) .................................. 2012-036368

(51) Int. Cl.
*A01G 9/00*  (2006.01)
*A01G 25/02* (2006.01)
(Continued)

(52) U.S. Cl.
CPC ................ *A01G 25/02* (2013.01); *A01G 9/00* (2013.01); *A01G 9/143* (2013.01); *A01G 9/247* (2013.01); *A01G 25/097* (2013.01); *B05B 15/06* (2013.01)

(58) Field of Classification Search
CPC ........ A01G 9/24; A01G 9/247; A01G 25/02; A01G 25/09; A01G 25/097; A01G 31/04; A01G 31/042

USPC .......................................... 47/48.5, 65, 901
See application file for complete search history.

(56) References Cited

U.S. PATENT DOCUMENTS

| 1,824,563 | A | * | 9/1931 | Wiley | ..................... | A01G 9/247 |
| | | | | | | 239/209 |
| 4,837,971 | A | * | 6/1989 | Visser | ..................... | A01G 9/143 |
| | | | | | | 47/17 |

(Continued)

FOREIGN PATENT DOCUMENTS

| CN | 2077755 | 5/1991 |
| CN | 1839252 | 9/2006 |

(Continued)

OTHER PUBLICATIONS

Office Action and Search Report mailed Jul. 1, 2015, in corresponding Chinese Application No. 201280070152.8 (with English translation of Search Report).

(Continued)

*Primary Examiner* — David Parsley
*Assistant Examiner* — Danielle Clerkley
(74) *Attorney, Agent, or Firm* — Wenderoth, Lind & Ponack, L.L.P.

(57) ABSTRACT

An irrigation device includes: a nozzle discharging liquid; a cover preventing the liquid discharged from the nozzle from splattering around the container; and a moving mechanism moving the cover between a first position and a second position. When moved to the first position, the cover covers space above the container. When moved to the second position, the cover is removed from the space above the container and the space is uncovered. The moving mechanism moves the cover (i) to the first position when the liquid is supplied to a plant, and (ii) to the second position when the supplying of the liquid to the plant ends.

4 Claims, 6 Drawing Sheets (51) Int. Cl.
*A01G 9/24* (2006.01)
*A01G 25/09* (2006.01)
*B05B 15/06* (2006.01)
*A01G 9/14* (2006.01)

(56) References Cited

U.S. PATENT DOCUMENTS

| | | | | |
|---|---|---|---|---|
| 5,212,903 | A * | 5/1993 | Talbott | A01G 9/242 239/242 |
| 6,360,482 | B1 * | 3/2002 | Boyes | A01G 9/247 47/62 A |
| 2007/0186542 | A1 | 8/2007 | Hirata | |
| 2013/0192131 | A1 * | 8/2013 | Abahusayn | A01G 9/14 47/17 |

FOREIGN PATENT DOCUMENTS

| | | |
|---|---|---|
| CN | 201067022 | 6/2008 |
| CN | 202075372 | 12/2011 |
| JP | 3-643 | 1/1991 |
| JP | 7-39258 | 2/1995 |
| JP | 10-108550 | 4/1998 |
| JP | 11-318214 | 11/1999 |
| JP | 2000-31 | 1/2000 |
| JP | 2000-209970 | 8/2000 |
| JP | 2004-187682 | 7/2004 |
| JP | 2009-296928 | 12/2009 |
| JP | 2013-34393 | 2/2013 |
| TW | 200611634 | 4/2006 |

OTHER PUBLICATIONS

International Search Report issued Mar. 12, 2013 in corresponding International Application No. PCT/JP2012/007839.

Office Action issued Jan. 14, 2016 in corresponding Chinese Application No. 201280070152.8 (with English translation of Search Report).

* cited by examiner

PLANT CULTIVATION SYSTEM

TECHNICAL FIELD

The present invention relates to a plant cultivation system which cultivates plants while moving containers where the plants are planted.

BACKGROUND ART

In conventional agriculture, plants are planted in agricultural lands for cultivation. In order to grow and harvest the plants, the conventional agriculture requires an aisle for people to move between the plants in soil. Hence techniques for such conventional agriculture have problems of low land-use efficiency and uneven growth among the plants depending on where the plants are planted.

In order to overcome the problems, Patent Literature 1 (PTL 1) exemplifies a plant cultivation system. The plant cultivation system utilizes a transporting conveyor to circularly move containers having plants. At multiple locations above the transporting conveyor, irrigation devices are located to supply the plants with liquids such as water. When the transporting conveyor moves the containers below the irrigation devices, the irrigation devices discharge liquid to the plants in the containers. Such structures make it possible to eliminate the need for aisles for a grower to move on, which contributes to an increase in land-use efficiency.

CITATION LIST

Patent Literature

[PTL 1]

Japanese Unexamined Utility Model Application Publication No. 03-000643

SUMMARY OF INVENTION

Technical Problem

The above conventional plant cultivation system, however, causes problems below. When the irrigation devices discharge a liquid to the plants, the liquid inevitably splatters around the containers. Hence the liquid splattered on equipment such as a transporting conveyor would promote progression of the corrosion of the equipment, leading to a potential malfunction of the equipment.

The present invention is conceived in view of the above problems and aims to provide a plant cultivation system which can prevent liquid from splattering around a container when the plant cultivation system waters a plant in the container.

Solution to Problem

A plant cultivation according to an implementation of the present invention includes: a transporting conveyor which transports a container, where the plant is planted, along a transport pathway; and an irrigation device which is located in an irrigation area on the transport pathway, and supplies liquid to the plant planted in the container, wherein the irrigation device includes: a nozzle which discharges, from above, the liquid to the container located in the irrigation area; a cover which prevents the liquid discharged from the nozzle from splattering around the container; and a moving mechanism which moves the cover between a first position and a second position, wherein (i) when moved to the first position, the cover covers space above the container located in the irrigation area, and (ii) when moved to the second position, the cover is removed from the space above the container located in the irrigation area and the space is uncovered, and the moving mechanism moves the cover (i) to the first position when the liquid is supplied to the plant, and (ii) to the second position when the supplying of the liquid to the plant ends.

When the liquid is supplied to the plant, such features allow the moving mechanism to move the cover to the first position and the cover covers space above the container. This can prevent the liquid discharged from the nozzle from splattering around the container. Thus the features can restrain progression of the corrosion of the equipment such as, for example, a transporting conveyor, which contributes to reducing malfunctions of the equipment.

In the plant cultivation system according to an implementation of the present invention, when the moving mechanism moves the cover to the first position, a bottom end portion of the cover may preferably be supported along an entire periphery of a top end portion defining an opening of the container.

When the moving mechanism moves the cover to the first position, such a feature makes it possible to secure an area of contact between the bottom end portion of the cover and the top end portion of the container, which contributes to an increase in the waterproof performance of the cover.

In the plant cultivation system according to an implementation of the present invention, preferably, the cover may be shaped into a box and the bottom end portion of the cover is open, and the bottom end portion of the cover may have a receiving recessed portion for receiving, from below, the liquid from the nozzle flowing down an inner surface of the cover.

When the liquid discharged from the nozzle makes contact with an inner surface of the cover, such features allows the receiving recessed portion, provided with the bottom end portion of the cover, to receive from below the liquid that spills down the inner surface of the cover. When the moving mechanism moves the cover to the second position, this makes it possible to prevent the liquid from dripping out of the bottom end portion of the cover.

In the plant cultivation system according to an implementation of the present invention, preferably, the irrigation device may further include a duct which discharges the liquid, received by the receiving recessed portion, out of the cover, and the duct may be in communication with the receiving recessed portion and extends outward from an outer surface of the cover.

Such features allow the liquid received by the receiving recessed portion to discharge out of the cover via the duct.

In the plant cultivation system according to an implementation of the present invention, preferably, the irrigation device may further include a compressed air supplying unit which supplies the nozzle with compressed air, and, when the supplying of the liquid to the plant ends, the compressed air supplying unit may supply the compressed air to the nozzle.

Such features make it possible to eject the liquid remaining inside the nozzle out of the nozzle by the pressure of the compressed air, which contributes to preventing the liquid from dripping out of the nozzle.

Advantageous Effects of Invention

When the liquid is supplied to the plant, such features allow the moving mechanism to move the cover to the first position and the cover covers space above the container. This can prevent the liquid discharged from the nozzle from splattering around the container. Thus the features can restrain progression of the corrosion of the equipment such as, for example, a transporting conveyor, which contributes to reducing malfunctions of the equipment.

DESCRIPTION OF EMBODIMENT

Described below is an embodiment of the present invention, with reference to the drawings. It is noted that the embodiment below represents a specific and beneficial example of the present invention. The numerical values, shapes, materials, constituent elements, arrangement positions of the constituent elements all described in the embodiment are examples, and shall not limit the present invention. The present invention shall be defined only by claims. Hence, among the constituent elements in the embodiment, those not described in an independent claim representing the most generic concept of the present invention are not necessarily required to achieve the objects of the present invention; however, such constituent elements are introduced to implement a preferable form of the present invention. It is noted that each of the drawings is a schematic one and not necessarily illustrated in detail.

Figure 1:
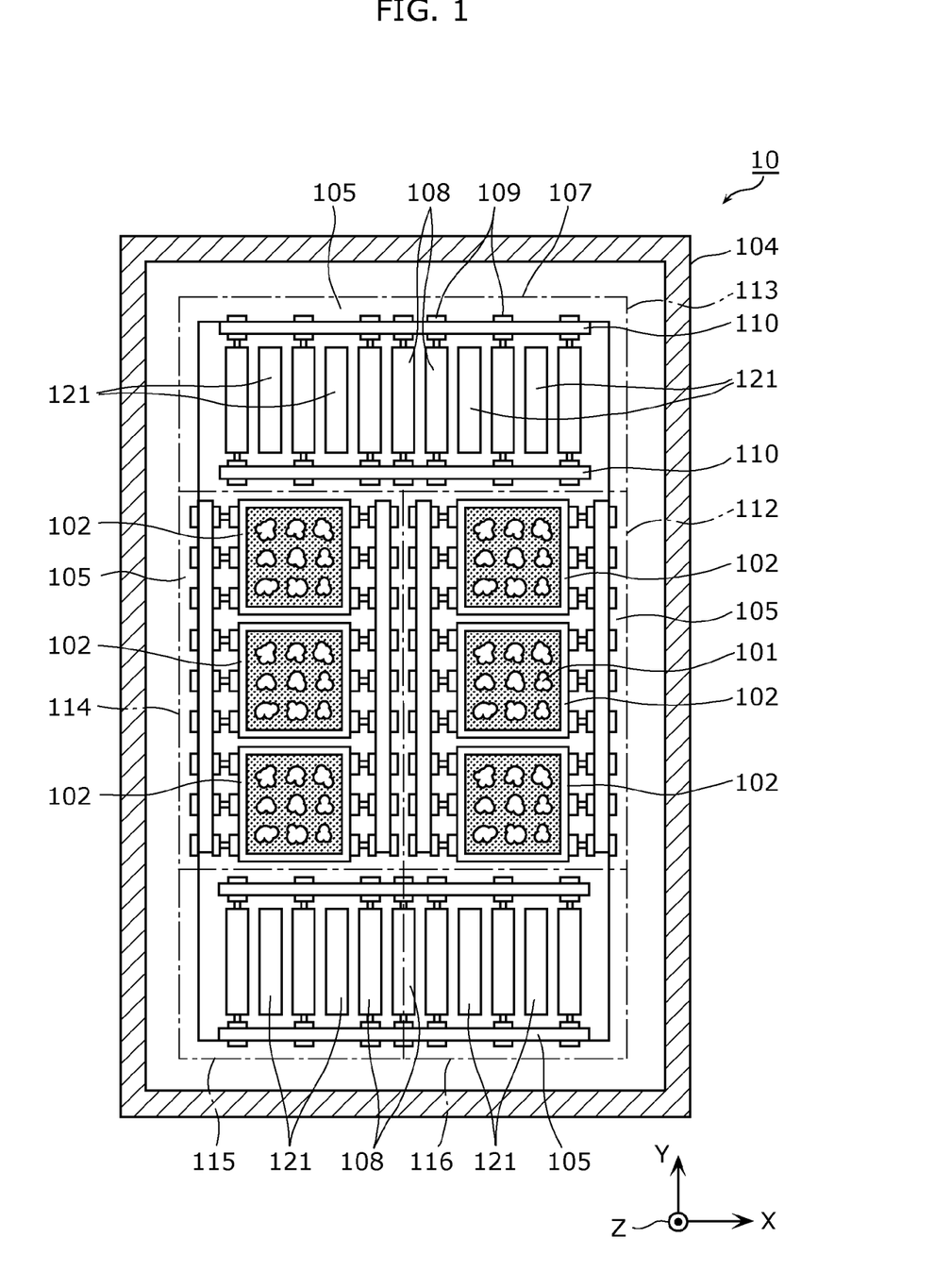
FIG. 1 represents a plan view illustrating a plant cultivation system according to an embodiment of the present invention.
Figure 2:
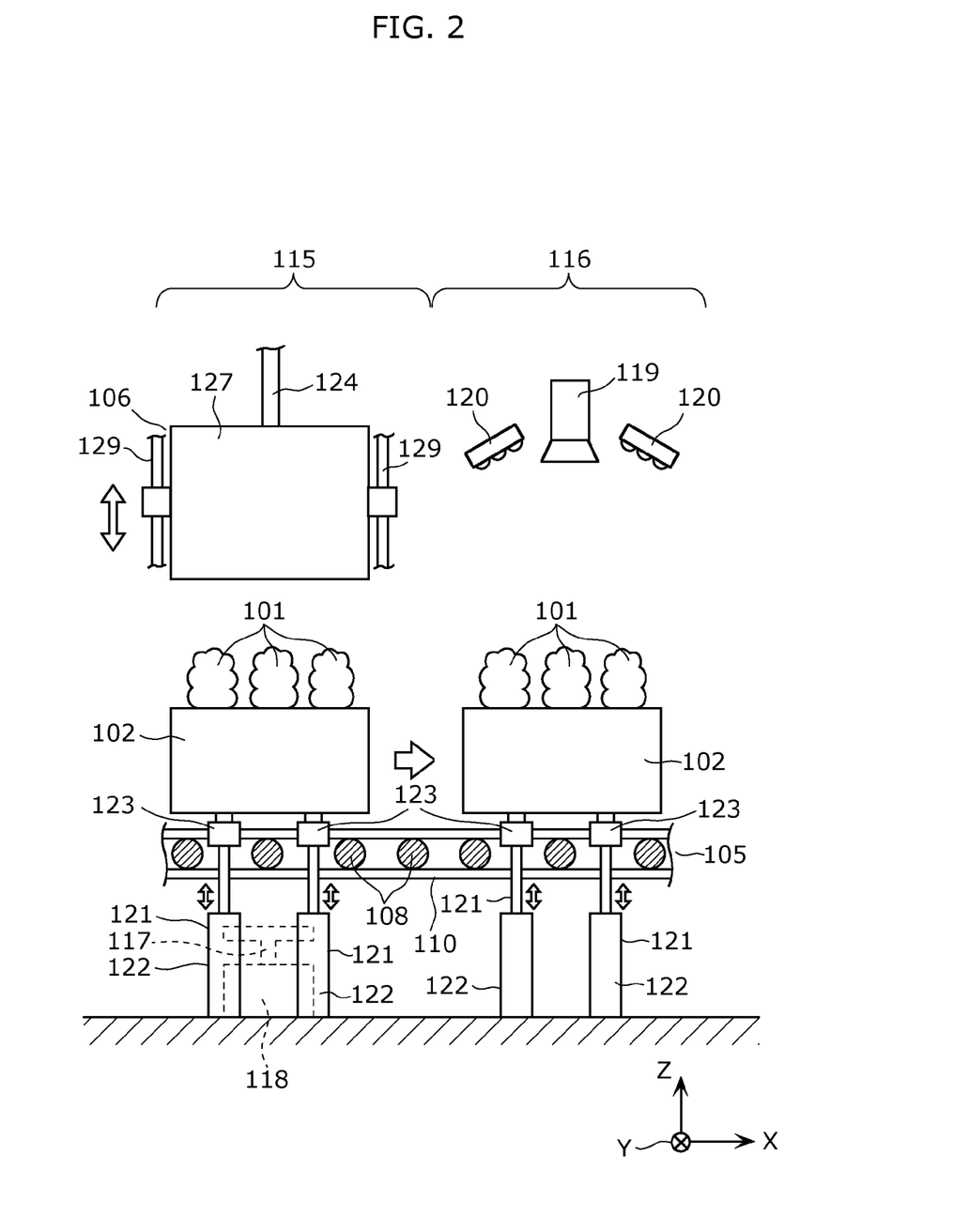
FIG. 2 represents a side view illustrating a part of the plant cultivation system in FIG. 1.

FIG. 1 represents a plan view illustrating a plant cultivation system according to an embodiment of the present invention. FIG. 2 represents a side view illustrating a part of the plant cultivation system in FIG. 1.

A plant cultivation system 10 according to the embodiment is used for cultivating a plant 101, such as a vegetable, a fruit, and a flower. The plant 101 cultivated by the plant cultivation system 10 is planted in a container 102. The container 102 has an opening along the top end portion, with its cross section shaped in a rectangular. The container 102 holds therein a cultivation bed 103 for planting the plant 101. It is noted that the cultivation bed 103 is made of substances such as soil for soil culture including fertilized one.

Described hereinafter is a structure of the plant cultivation system 10 according to the embodiment. As represented in FIGS. 1 and 2, the plant cultivation system 10 according to the embodiment includes a building 104, a transporting conveyor 105, and an irrigation device 106. The transporting conveyor 105 and the irrigation device 106 are both installed in the building 104.

The building 104 is a structure to protect equipment such as the transporting conveyor 105 and the irrigation device 106 from an outside environment such as rain and wind. The temperature and humidity in the building 104 are arbitrarily adjusted by an air conditioner (not shown) installed in the building 104.

The transporting conveyor 105 is used for planarly transporting the container 102, having the plant 101, along a transporting pathway 107. In the embodiment, the transporting conveyor 105 is a lineshaft roller conveyor. The transporting conveyor 105 is formed of a frame (not shown) and multiple transporting rollers 108. The transporting rollers 108 are rotatably supported by the frame. Pulleys 109 are attached to both ends of each of the transporting rollers 108. The pulleys 109 are connected with each other by an endless belt 110. The endless belt 110 is also connected to a power source (not shown) such as an electric motor. The power source drives the endless belt 110, which rotates each of the transporting rollers 108 and transports the container 102 placed on the transporting rollers 108. It is noted that the power source is driven and stopped by a control program included in a control unit (not shown). The control unit is installed in the building 104, for example.

In the embodiment, the transporting pathway 107 defined by the transporting conveyor 105 is a circulation pathway extending in a rectangular shape. The transporting pathway 107 has the following stations in the following order: a growing station 112, a stand-by station 113, a growing station 114, an irrigation station 115 (working as an irrigation area), and a monitoring station 116.

The growing stations 112 and 114 are areas for growing a plant 101 in each of containers 102. Provided above the growing stations 112 and 114 are lighting devices (not shown) having, for example, LEDs as the light sources. The lighting devices emit light to each of plants 101 while the containers 102 are located in the growing stations 112 and 114, so that the plants 101 can grow. It is noted that each of the growing stations 112 and 114 can hold multiple containers 102.

The stand-by station 113 is an area for temporarily holding a container 102 when the container 102 is transported along the transporting pathway 107.

The irrigation station 115 is an area for supplying a plant 101 with liquids (such as water or water solution including liquid fertilizer and growth stimulant agent). As represented in FIG. 2, provided above the irrigation station 115 is the irrigation device 106. The structure of the irrigation device 106 shall be described later. Moreover, provided below the irrigation station 115 is a weight measuring device 117. The weight measuring device 117 is used to weigh a container 102 having a plant 101. The weight measuring device 117 weighs the container 102 to check whether or not the plant 101 is supplied with, for example, a defined amount of liquid. In the weighing, the weight measuring device 117 is elevated by an elevator 118 above the transporting conveyor 105. When the weighing ends, the weight measuring device 117 is moved down by the elevator 118 below the transporting conveyor 105. It is noted that the irrigation station 115 can hold a single container 102.

The monitoring station 116 is an area for observing conditions of a cultivation bed 103, the growth of a plant 101, and the like. As represented in FIG. 2, provided above the monitoring station 116 are a camera 119 and a lighting device 120. When a container 102 is located to the monitoring station 116, the lighting device 120 irradiates a plant 101 in the container 102 and the camera 110 obtains an image of the plant 101. The image of the plant 101 obtained by the camera 119 is displayed on a monitor (not shown) provided in a separate room. It is noted that the monitoring station 116 can hold a single container 102.

A transporting conveyor 105 in each of the growing stations 112 and 114 moves in the Y-axis direction in FIG. 1. A transporting conveyor 105 in each of the stand-by station 113, the irrigation station 115, and the monitoring station 116 moves in the X-axis direction in FIG. 1. The level (hereinafter referred to as "first level") of the transporting conveyor 105 in each of the growing stations 112 and 105 is set above the level (hereinafter referred to as "second level") of the transporting conveyor 105 in each of the irrigation station 115 and the monitoring station 116. It is noted that the level denotes a position in height direction (the Z-axis direction in FIG. 1).

Each of the stand-by station 113, the irrigation station 115, and the monitoring station 116 includes a transferring device 121 for transferring the containers 102 between the transporting conveyors 105 each transporting the containers 102 in a different direction. The transferring device 121 includes an elevator 122 and a moving device 123 mounted on the top end portion of the elevator 122. The elevator 122 may be, for example, a cylinder. The elevator 122 moves a container 102 up and down between the first and second levels. The moving device 123 may be, for example, a roller chain. The moving device 123 is used to move a container 102 lifted by the elevator 122 in the moving direction (the Y-axis direction in FIG. 1) of the transporting conveyor 105 provided in each of the growing stations 112 and 114. The moving device 123 can transit between a pair of neighboring transporting rollers 108. It is noted that the transferring device 121 is driven and stopped by a control program included in the control unit (not shown).

When a container 102 is transported from the growing station 114 to the irrigation station 115, for example, the moving device 123 provided in the irrigation station 115 is elevated by the elevator 122 to the first level. Here the moving device 123 is driven to transport the container 102, placed on the moving device 123, from the growing station 114 to the irrigation station 115. When the transportation ends, the moving device 123, provided in the irrigation station 115, stops driving and is moved down by the elevator 122 below the second level. Hence the container 102 descends from the first level to the second level, and is placed on the transporting conveyor 105 in the irrigation station 115.

When the container 102 is transported from the monitoring station 116 to the growing station 112, a moving device 123 provided in the monitoring station 116 is elevated by the elevator 122 to the first level. Hence the container 102 located in the monitoring station 116 is lifted from the second level to the first level. Here the moving device 123 is driven to transport the container 102 from the monitoring station 116 to the growing station 112. When the transportation ends, the moving device 123, provided in the monitoring station 116, stops driving and is moved down by the elevator 122 below the second level.

The transferring devices 121 are driven in a sequence similar to the above sequence when transporting the container 102 from the growing station 112 to the stand-by station 113 and from the stand-by station 113 to the growing station 114.

Figure 3:
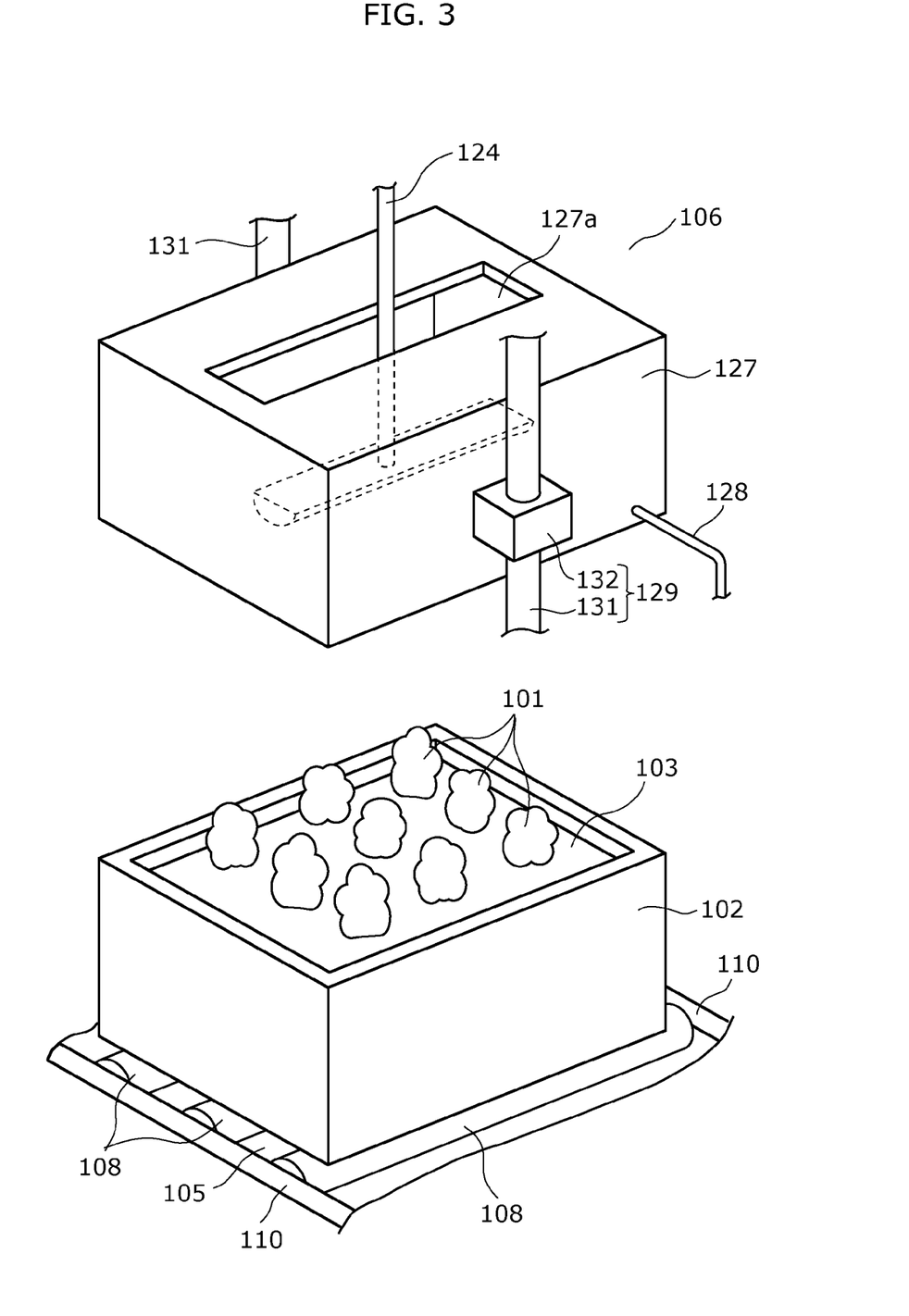
FIG. 3 represents a perspective view illustrating an irrigation device and a container when a cover is set at a second position.
Figure 4:
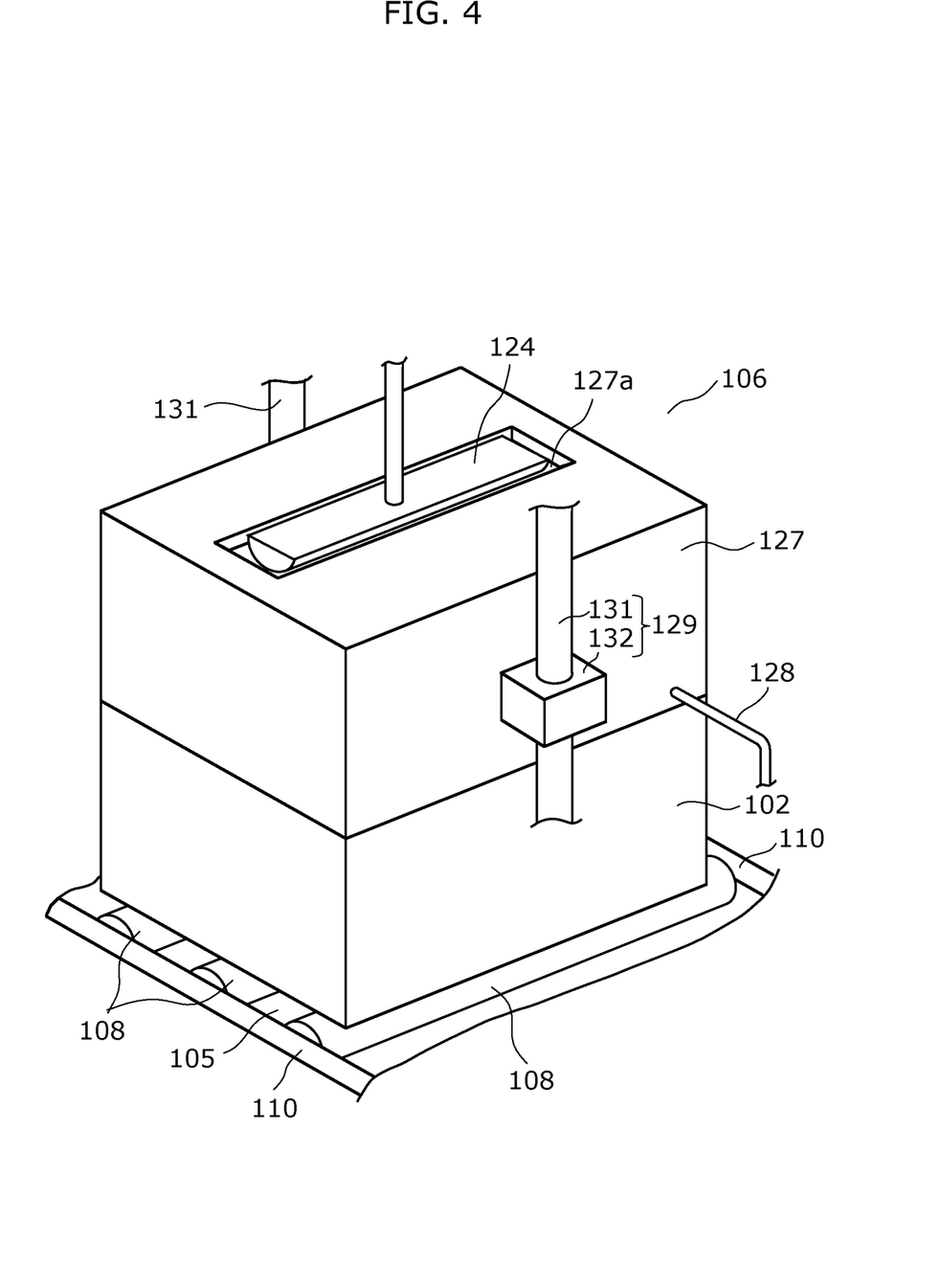
FIG. 4 represents a perspective view illustrating the irrigation device and the container when the cover is set at a first position.
Figure 5:
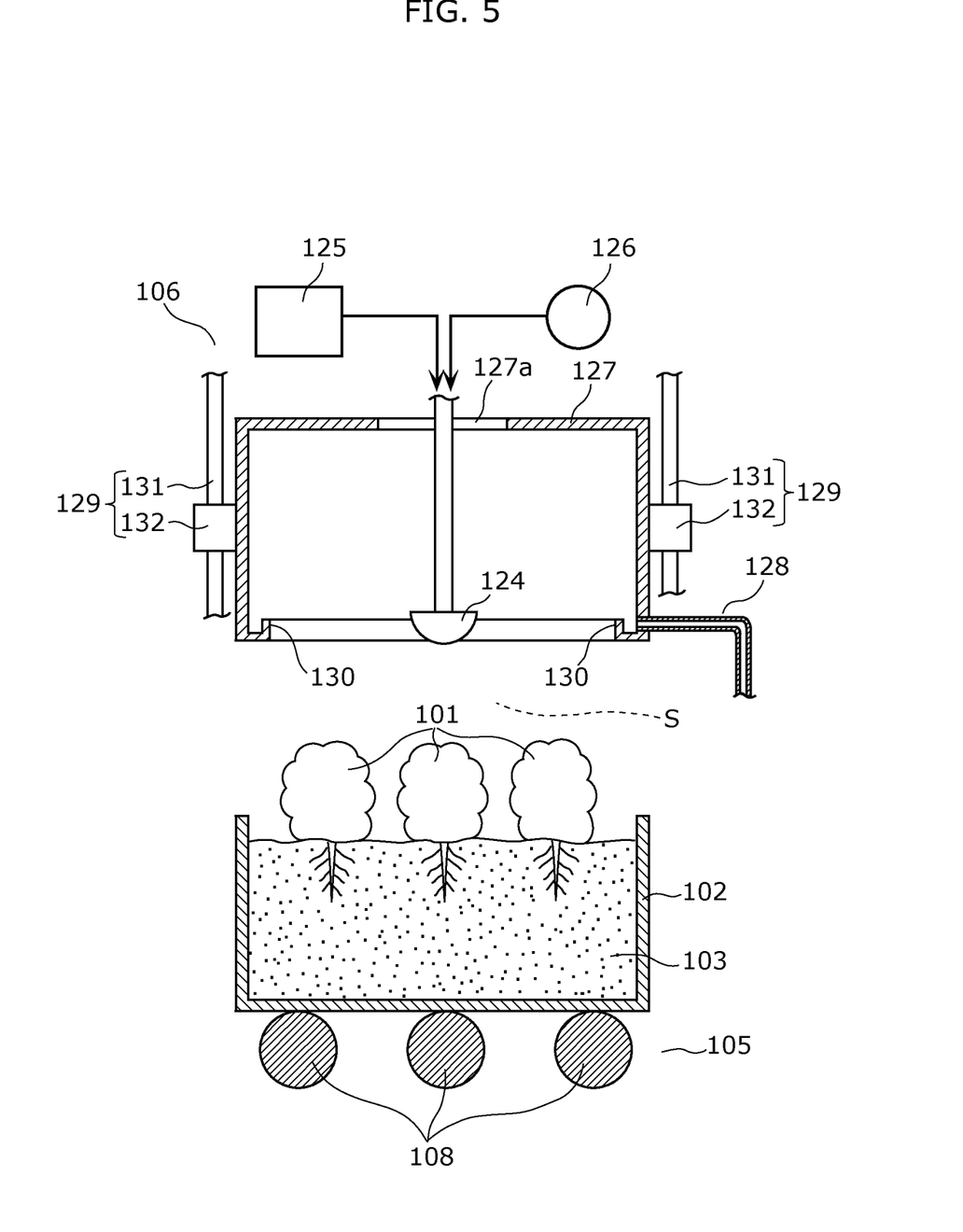
FIG. 5 represents a cross-section view illustrating the irrigation device and the container when the cover is set at the second position.
Figure 6:
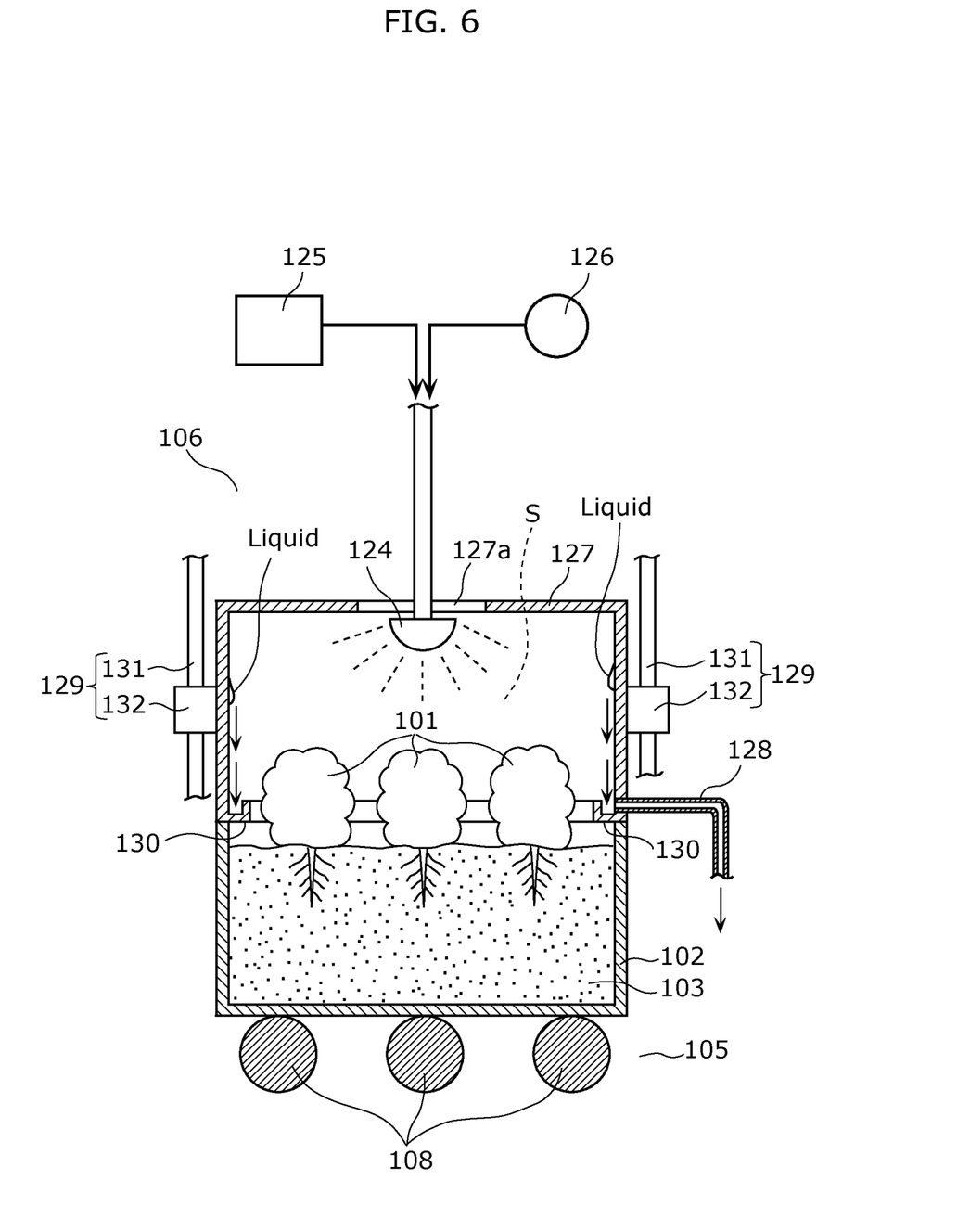
FIG. 6 represents a cross-section view illustrating the irrigation device and the container when the cover is set at the first position.

Described next is a structure of the above-described irrigation unit 106. FIG. 3 represents a perspective view illustrating an irrigation device and a container when a cover is set at the second position. FIG. 4 represents a perspective view illustrating the irrigation device and the container when the cover is set at the first position. FIG. 5 represents a cross-section view illustrating the irrigation unit and the container when the cover is set at the second position. FIG. 6 represents a cross-section view illustrating the irrigation unit and the container when the cover is set at the first position. The irrigation unit 106 illustrated in FIGS. 3 to 6 includes a nozzle 124, a liquid supplying unit 125, a compressed air supplying unit 126, a cover 127, a duct 128, and a moving mechanism 129.

The nozzle 124 is supported above the transporting conveyor 105 in the irrigation station 115. The nozzle 124 is connected to the liquid supplying unit 125 and the compressed air supplying unit 126. The liquid supplying unit 125 may be, for example, a tank for holding liquid. The compressed air supplying unit 126 may be, for example, a compressor for supplying compressed air. Each of the liquid supplying unit 125 and the compressed air supplying unit 126 is driven and stopped by a control program included in the above control unit (not shown).

When supplying liquid to the plant 101, the liquid supplying unit 125 supplies the nozzle 124 with the liquid. Hence the nozzle 124 radially discharges the liquid to the plant 101. When the supplying of the liquid to the plant 101 ends, the liquid supplying unit 125 stops supplying the liquid to the nozzle 124, and the compressed air supplying unit 126 supplies compressed air to the nozzle 124. Hence the liquid remaining inside the nozzle 124 is ejected out of the nozzle 124 by the pressure of the compressed air.

The cover 127 has its cross section shaped into a rectangular box while its bottom end portion is open. The top surface of the cover 127 has an opening 127a through which the nozzle 124 is provided. The bottom end portion of the cover 127 has a receiving recessed portion 130 for receiving, from below, liquid from the nozzle flowing down an inner surface of the cover 127. The receiving recessed portion 130 is shaped like a gutter and extends from the bottom end portion of the cover 127 toward the inside of the cover 127. The opening along the bottom end portion of the cover 127 is approximately the same in size as the opening along the top end portion of the container 102.

It is noted that the cover 127 may have an opening (not shown) on a side surface thereof for checking, from outside, how the inside of the cover 127 is irrigated. The opening is provided with, for example, a transparent acrylic panel.

The duct 128 extends outwards from an outer surface of the cover 127. One end of the duct 128 is in communication with the inside of the receiving recessed portion 130 through the cover 127. The duct 128 has the other end communicated with a drain duct (not shown) provided inside the building 104. The liquid received by the receiving recessed portion 130 is discharged out of the cover 127 via the duct 128.

The moving mechanism 129 is a cylinder mechanism including a pair of rods 131 which vertically extend and a pair of holders 132. Each of the holders 132 is slidably attached to a different one of the rods 131. Each of the holders 132 is magnetized and attached to an outer surface of the cover 127. Each of the rods 131 includes a magnetic body (not-shown) which is vertically movable within the rod 131. Between the magnetic body and the holder 132, a force (magnetic force) acts so that the magnetic body and the holder 132 attract each other. When the magnetic body ascends or descends inside the rod 131, the holder 132 follows the movement of the magnetic body to ascend or descend along the rod 131. The moving mechanism 129 allows the cover 127 to shuttle between the first position (see FIGS. 4 and 6) and the second position (see FIGS. 3 and 5).

The moving mechanism 129 is driven or stopped by the control program included in the above control unit (not shown).

When moved to the first position, the cover 127 covers space S above the container 102 located in the irrigation station 115. Here the cover 127 has the receiving recessed portion 130 supported along the entire periphery of the top portion defining the opening of the container 102. When moved to the second position, the cover 127 is removed from the space S above the container 102 located in the irrigation station 115, and the space S is uncovered.

It is noted that, the cover 127 is preferably designed taller than the average height of the plant 101 grown until, for example, the harvest season, so that the plant 101 is completely held inside the cover 127 when the cover 127 is set to the first position.

Described next is how to cultivate the plant 101 by the plant cultivation system 10. The plant cultivation system 10 according to the embodiment alternately sets a growth period for letting the plant 101 grow in the growing stations 112 and 114, and a cultivation period for cultivating the plant 101 such as supplying liquid. For example, a growth period is approximately four hours, and a cultivation period is approximately 30 minutes.

In the growth period, all the transporting conveyors 105 in each of the stations 112 to 116 are stopped, and all the containers 102 are placed on the transporting conveyors 105 in the growing stations 112 and 114. The lighting devices installed in the growing stations 112 and 114 emit light to the plant 101, and the plants 101 grow.

In the cultivation period, all or a part of the transporting conveyors 105 in each of the stations 112 to 116 are driven. A container 102 located in the growing station 114 is circularly transported in the order of the irrigation station 115, the monitoring station 116, the growing station 112, the stand-by station 113, and the growing station 114. A container 102 located in the growing station 112 is circularly transported in the order of the stand-by station 113, the growing station 114, the irrigation station 115, the monitoring station 116, and the growing station 112.

In the irrigation station 115, the weight measuring device 117 weighs a container 102 having a plant 101, and then the irrigation device 106 supplies the plant 101 with liquid. Described next is how the irrigation device 106 supplies the liquid. It is noted that, at the moment when the container 102 is transported to the irrigation station 115, the cover 127 is set to the second position (see FIGS. 3 and 5). The moving mechanism 129 moves down the cover 127 from the second position to the first position, and the cover 127 covers the space S above the container 102 (see FIGS. 4 and 6). The receiving recessed portion 130 of the cover 127 is supported along the entire periphery of the top portion defining the opening of the container 102. Thus the liquid supplying unit 125 supplies the liquid to the nozzle 124, and the nozzle 124 radially discharges the liquid to the plant 101. Here the cover 127 can prevent the liquid discharged from the nozzle 124 from splattering around the container 102.

When the supplying of the liquid to the plant 101 ends, the liquid supplying unit 125 stops supplying the liquid to the nozzle 124, and the compressed air supplying unit 126 supplies compressed air to the nozzle 124. Hence the liquid remaining inside the nozzle 124 is ejected out of the nozzle 124, which contributes to preventing the liquid from dripping out of the nozzle 124. It is noted that the compressed air from the nozzle 124 may be blown to the plant 101 in order to remove the liquid on the surface of the plant 101.

After the compressed air supplying unit 126 stops supplying the compressed air to the nozzle 124, the moving mechanism 129 elevates the cover 127 from the first position to the second position. Thus the irrigation in the irrigation station 115 ends.

It is noted that when the nozzle 124 discharges the liquid, the liquid could make contact with an inner surface of the cover 127. In such a case, as represented in FIG. 6, the liquid which spills down the inner surface of the cover 127 is received from below by the receiving recessed portion 130. Such a feature makes it possible to prevent the liquid from dripping out of the bottom end portion of the cover 127 when the cover 127 elevates from the first position to the second position. The liquid received by the receiving recessed portion 130 is discharged out of the cover 127 via the duct 128.

When the irrigation ends in the irrigation station 115, the container 102 is transported by the transporting conveyor 105 from the irrigation station 115 to the monitoring station 116. In the monitoring station 116, the lighting device 120 irradiates the plant 101 with light, and the camera 119 obtains an image of the plant 101.

After the plants 101 held in all the containers 102 are watered in the irrigation station 115 and have their images obtained in the monitoring station 116, all the containers 102 are moved back to the growing stations 112 and 114. Then the transporting conveyors 105 in each of the stations 112 to 116 are stopped. Hence the cultivation period ends, and then the growth period begins again.

The plant cultivation system 10 according to the embodiment can achieve the effects below. When the nozzle 124 discharges liquid, the cover 127 is moved from the second position to the first position to cover the space S above a container 102. Such a feature can prevent the liquid discharged from the nozzle 124 from splattering around the container 102. Thus the feature can restrain progression of the corrosion of the equipment such as, for example, a transporting conveyor 105, which contributes to reducing malfunctions of the equipment.

The plant cultivation system of the present invention has been described according to the embodiment; however, the present invention shall not be defined only by the embodiment. The present invention may include any modification made to the embodiment by the person skilled in the art.

In the embodiment, the cover is shaped into a box. Here that "shaped into a box" may include a cylindrical shape whose top end portion and bottom end portion define openings.

In the above embodiment, the transporting conveyor is a lineshaft roller conveyor. Instead, the transporting conveyor may be, for example, a belt conveyor.

In the embodiment, the receiving recessed portion is provided to the bottom end portion of the cover; however, the receiving recessed portion may be omitted. With the receiving recessed portion omitted, the bottom end portion of the cover is supported along the entire periphery of the top end portion defining the opening of the container when the moving mechanism moves the cover to the first position.

INDUSTRIAL APPLICABILITY

The present invention is applicable as a plant cultivation system which cultivates plants while moving containers where the plants are planted.

REFERENCE SIGNS LIST

10 Plant cultivation system
101 Plant

102 Container
103 Cultivation bed
104 Building
105 Transporting conveyor
106 Irrigation device
107 Transporting pathway
108 Transporting roller
109 Pulley
110 Endless belt 110
112 and 114 Growing station
113 Stand-by station
115 Irrigation station (irrigation area)
116 Monitoring station
117 Weight measuring device
118 Elevator
119 Camera
120 Lighting device
121 Transferring device
122 Elevator
123 Moving device
124 Nozzle
125 Liquid supplying unit
126 Compressed air supplying unit
127 Cover
127a Opening
128 Duct
129 Moving mechanism
130 Receiving recessed portion
131 Rod
132 Holder
S Space

The invention claimed is:

1. A plant cultivation system for cultivating a plant, the plant cultivation system comprising:
   a transporting conveyor which transports a container, where the plant is planted, along a transport pathway; and
   an irrigation device which is located in an irrigation area on the transport pathway, and supplies liquid to the plant planted in the container,
   wherein the irrigation device includes:
      a nozzle which discharges, from above, the liquid to the container located in the irrigation area;
      a cover which has a box shape with a bottom end portion open, and prevents the liquid discharged from the nozzle from splattering around the container; and
      a moving mechanism which moves the cover between a first position and a second position,
      the bottom end portion of the cover has a receiving recessed portion extending from the bottom end portion of the cover toward an inside of the cover, for receiving the liquid from the nozzle flowing down an inner surface of the cover, and
      the nozzle extends through a top surface of the cover,
   wherein (i) when moved to the first position, the cover covers space above the container located in the irrigation area, and (ii) when moved to the second position, the cover is removed from the space above the container located in the irrigation area and the space is uncovered, and
   the moving mechanism moves the cover (i) to the first position when the liquid is supplied to the plant, and (ii) to the second position when the supplying of the liquid to the plant ends.

2. The plant cultivation system according to claim 1 wherein when the moving mechanism moves the cover to the first position, the bottom end portion of the cover is supported along an entire periphery of a top end portion defining an opening of the container.

3. The plant cultivation system according to claim 1, wherein the irrigation device further includes a duct which discharges the liquid, received by the receiving recessed portion, out of the cover, and
the duct is in communication with the receiving recessed portion and extends outward from an outer surface of the cover.

4. The plant cultivation system according to claim 1, wherein the irrigation device further includes a compressed air supplying unit configured to supply the nozzle with compressed air, and
when the supplying of the liquid to the plant ends, the compressed air supplying unit is configured to supply the compressed air to the nozzle.

* * * * *